Sept. 21, 1948.  R. HARGREAVES ET AL  2,449,773
SPINDLE BRAKE
Filed May 18, 1946
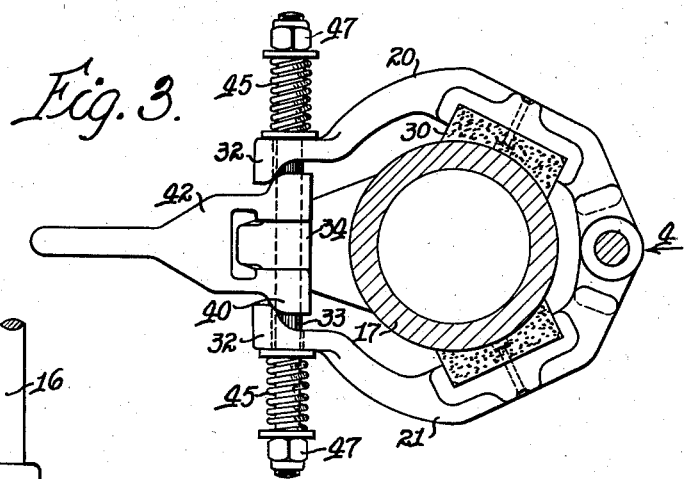
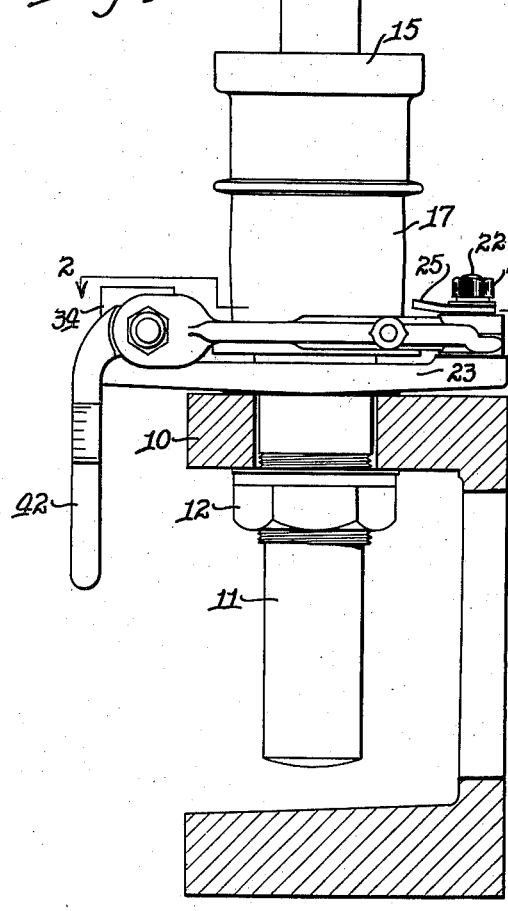
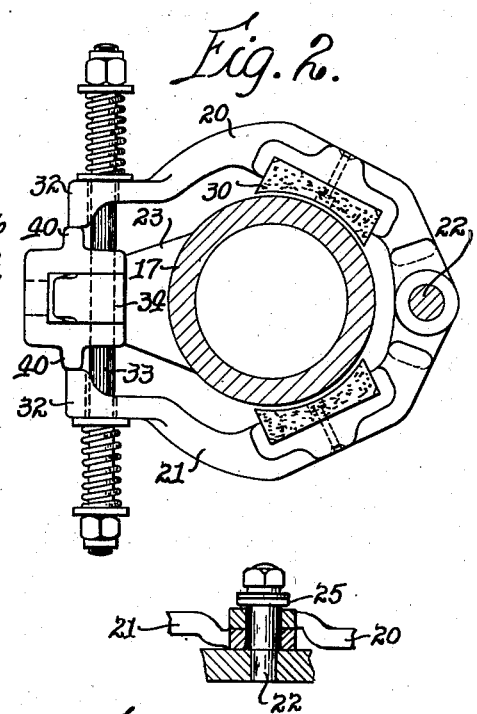
INVENTORS.
Robert Hargreaves
Albert O. Roy.
BY Chas. T. Hawley
ATTY.

Patented Sept. 21, 1948

2,449,773

UNITED STATES PATENT OFFICE 2,449,773

SPINDLE BRAKE

Robert Hargreaves and Albert O. Roy, Whitinsville, Mass., assignors to Whitin Machine Works, Whitinsville, Mass., a corporation of Massachusetts Application May 18, 1946, Serial No. 670,730

1 Claim. (Cl. 188—166)

This invention relates to spindles used in spinning or twisting yarn and relates more particularly to an improved brake for stopping the rotation of such a spindle for doffing or for any other desired purpose.

Under present practice, the loads and speeds of rotation of spinning and twisting spindles vary widely. The braking force applied to stop such spindles should be duly apportioned to the operating conditions, as too much braking force may cause breakage or damage of spindle blades or other spindle parts and may also cause excessive vibration. On the other hand, the application of tool little force prolongs the stopping period and wastes the operator's time.

It is the general object of our invention to provide an improved spindle brake in which provision is made for quickly and easily adjusting the braking pressure and the corresponding stopping period.

A further object is to provide a simple braking structure which may be easily and economically manufactured and which will be satisfactory and reliable in use.

Our invention further relates to arrangements and combinations of parts which will be hereinafter described and more particularly pointed out in the appended claim.

A preferred form of the invention is shown in the drawings, in which

Fig. 1 is a side elevation of a twister spindle having our improved spindle brake applied thereto;

Fig. 2 is a sectional plan view, taken along the line 2—2 in Fig. 1;

Fig. 3 is a sectional plan view similar to Fig. 2 but showing the parts in operative or braking position; and Fig. 4 is a detail sectional elevation, looking in the general direction of the arrow 4 in Fig. 3.

Referring to the drawings, we have shown a spindle rail 10 in which a bolster case or spindle base 11 is secured by the usual clamping nut 12. A spindle 15 is rotatable in the spindle base 11 and comprises a blade 16 and a driving whirl 17.

Our improved spindle brake comprises a pair of arms 20 and 21 pivoted on a stud 22 which is mounted in a flange 23 forming a part of the bolster case or spindle base 11. A doffer guard 25 is also mounted on the stud 22. The parts 20, 21 and 25 are retained in position by a nut 26, but are free to turn or be turned.

The arms 20 and 21 are provided with friction pads 30 of leather or other suitable material, which pads are positioned to engage the lower portion of the whirl 17. The free ends 32 of the arms 20 and 21 are perforated to loosely receive a rod 33 which is mounted in a projection 34 extending upward from the flange 23.

The ends 32 of the arms 20 and 21 are projected inward as shown in Fig. 2 and are engaged by cam lugs 40 on the opposite sides of a hand lever 42 which is pivoted on the rod 33. Springs 45 are mounted on the ends of the rod 33, with their inner ends engaging the outer surfaces of the arms 20 and 21. The springs are retained on the rod 33 by nuts 47, which may be adjusted to secure any desired pressure of the springs 45 on the arms 20 and 21.

The normal running position of the parts is as shown in Fig. 2, with the arms 20 and 21 engaged and forced apart by the cam lugs 40, and with the brake pads 30 clearing the spindle whirl 17.

When it is desired to stop the spindle, the hand lever 42 is swung upward from the running position shown in Figs. 1 and 2 to the stopping position shown in Fig. 3. In the latter position the lugs 40 are clear of the ends 32 of the arms 20 and 21, so that the pads 30 are forced against the whirl 17 by the springs 45. These springs may be adjusted as above described to apply such braking pressure as will stop the spindle in such a period that excessive strain will be avoided, while the operator's time is simultaneously conserved.

After the full spool has been removed and replaced by an empty spool, or after some other desired operation has been performed, the hand lever 42 is returned to the normal or running position shown in Figs. 1 and 2 and the spindle is left free to rotate.

Having thus described our invention and the advantages thereof, we do not wish to be limited to the details herein disclosed, otherwise than as set forth in the claim, but what we claim is:

A spindle brake comprising a pair of pivoted arms encircling the spindle and having braking pads to engage said spindle and having cam end surfaces, springs to apply braking pressure to said arms and pads, a rod extending loosely through the ends of said arms and on which said springs are loosely mounted, a hand lever loosely mounted on said rod and between the outer ends of said arms and provided with axially projecting cam lugs engageable with the cam surfaces at the outer ends of said arms to force said arms apart, and abutting means on the opposite ends of said rod to resist the outward thrust of said springs.

ROBERT HARGREAVES.
ALBERT O. ROY.

REFERENCES CITED

The following references are of record in the file of this patent:

UNITED STATES PATENTS

| Number | Name | Date |
| --- | --- | --- |
| 586,745 | Pierce et al. | July 20, 1897 |
| 996,854 | Hinckley | July 4, 1911 |
| 1,188,098 | Phillips | June 20, 1916 |
| 1,383,200 | Gormley | June 28, 1921 |
| 1,729,015 | Seidman | Sept. 24, 1929 |
| 2,233,798 | Robins | Mar. 4, 1941 |